United States Patent
Song et al.

(10) Patent No.: US 10,378,352 B2
(45) Date of Patent: Aug. 13, 2019

(54) METHOD FOR REALIZING CENTRALIZED CONTROL PLATFORM FOR LARGE FULLY-MECHANIZED COAL MINING FACE EQUIPMENT

(71) Applicant: TAIYUAN UNIVERSITY OF TECHNOLOGY, Shanxi (CN)

(72) Inventors: Jiancheng Song, Shanxi (CN); Muqin Tian, Shanxi (CN); Chunyu Xu, Shanxi (CN); Lingyan Lin, Shanxi (CN); Jun Guo, Shanxi (CN); Yayun Yu, Shanxi (CN); Zexin Geng, Shanxi (CN)

(73) Assignee: TAIYUAN UNIVERSITY OF TECHNOLOGY, Taiyuan, Shanxi (CN)

( * ) Notice: Subject to any disclaimer, the term of this patent is extended or adjusted under 35 U.S.C. 154(b) by 0 days.

(21) Appl. No.: 15/752,361

(22) PCT Filed: Jun. 1, 2016

(86) PCT No.: PCT/CN2016/084400
§ 371 (c)(1),
(2) Date: Feb. 13, 2018

(87) PCT Pub. No.: WO2017/032121
PCT Pub. Date: Mar. 2, 2017

(65) Prior Publication Data
US 2019/0003304 A1 Jan. 3, 2019

(30) Foreign Application Priority Data
Aug. 25, 2015 (CN) .......................... 2015 1 0527484

(51) Int. Cl.
*E21C 35/24* (2006.01)
*E21F 13/06* (2006.01)
(Continued)

(52) U.S. Cl.
CPC ............ *E21C 35/24* (2013.01); *E21F 13/066* (2013.01); *G05B 19/0428* (2013.01); *G05B 23/0251* (2013.01); *G05B 2219/2616* (2013.01)

(58) Field of Classification Search
CPC ..................................................... E21C 35/24
See application file for complete search history.

(56) References Cited

U.S. PATENT DOCUMENTS 5,087,099 A * 2/1992 Stolarczyk .............. E21C 35/24
299/1.6
8,777,325 B2 * 7/2014 Wesselmann ........... E21C 35/24
299/1.7

(Continued)

*Primary Examiner* — Janine M Kreck
(74) *Attorney, Agent, or Firm* — Morgan, Lewis & Bockius LLP

(57) ABSTRACT

A method for realizing a centralized control platform for large fully-mechanized coal mining face equipment is provided. In the method, on the basis of a coal cutter system, a hydraulic support system, a coal mining face transportation system, an emulsion pump station system, a mobile transformer substation system and a video monitoring system of the large fully-mechanized coal mining face equipment, real-time monitoring, centralized coordination control and information communication network are realized by a high-speed embedded computer UNO-3072A, a high-speed data acquisition card PCI-1716, a PowerBuilder front-end development platform, an SQLServer database, a Modbus TCP/IP communication protocol and an industrial Ethernet, thereby realizing centralized control over the large underground fully-mechanized coal mining face equipment. Automated production of fully-mechanized coal mining faces is realized.

3 Claims, 3 Drawing Sheets

(51) Int. Cl.
*G05B 19/042* (2006.01)
*G05B 23/02* (2006.01)

(56) References Cited

U.S. PATENT DOCUMENTS

| | | | |
|---|---|---|---|
| 9,810,066 B2* | 11/2017 | Westphalen | E21C 27/32 |
| 2016/0061035 A1* | 3/2016 | Siegrist | E21F 17/18 |
| | | | 340/686.1 |
| 2017/0019641 A1* | 1/2017 | Rahms | H04N 7/181 |

* cited by examiner to be started or stopped, the fully-mechanized coal mining equipment must be started in an order from the belt, the crusher, the transfer machine, the scraper conveyer to the coal cutter, i.e., in a reverse coal flow order. When the coal mining face changes from operation to stop, in order to allow all coal cut by the coal cutter to be transported to the outside of the coal mining face and to make preparation for the next start, the fully-mechanized coal mining equipment must be stopped in an order from the coal cutter, the scraper conveyer, the transfer machine, the crusher to the belt, i.e., in a coal flow order. When the equipment operating on the coal mining face is automatically stopped due to a failure, to avoid overload on other devices caused by coal piling as far as possible, the devices in the coal flow direction of the faulted device are stopped successfully in the coal flow order, and the devices in the reverse coal flow direction of the faulted device are stopped immediately. As can be seen, at present, the control over the devices of the fully-mechanized coal mining face is merely a simple start-stop control, and there are no channels for information communication between the devices, so that the automatic interlinked control cannot be truly realized. Unmanned or few-manned coal mining faces emerged in the United Kingdom in 1980s, that is, for a coal mining face, the automatic connection of various parts such as mining, supporting, transportation and supply could be realized by only a few persons, thereby realizing the purpose of efficient production and greatly improving the production efficiency. However, any application of the intelligent centralized control mode in which multiple devices are unified and coordinated under the control of a centralized platform is not yet reported in China and abroad. Therefore, it is very necessary to establish a centralized control platform for large fully-mechanized coal mining face equipment, explore the centralized coordination intelligent control rules of a fully-mechanized coal mining face group control system, propose intelligent control methods and control strategies suitable for the fully-mechanized coal mining face equipment, and provide the theoretical and technical support for the unmanned intelligent coal mining target of the fully-mechanized coal mining face.

METHOD FOR REALIZING CENTRALIZED CONTROL PLATFORM FOR LARGE FULLY-MECHANIZED COAL MINING FACE EQUIPMENT

RELATED APPLICATIONS

This application is the U.S. national stage application of International (PCT) Patent Application Serial No. PCT/CN2016/084400, filed Jun. 1, 2016, which claims the benefit of Chinese Application No. 201510527484X, filed Aug. 25, 2015. The entire disclosure of each of these applications is hereby incorporated by reference.

TECHNICAL FIELD

The present invention relates to a method for realizing a centralized control platform and in particular to a method for realizing a central control platform for large fully-mechanized coal mining face equipment.

BACKGROUND OF THE PRESENT INVENTION

There are abundant coal resources in China, which account for above 70% of primary energy resources. The coal industry in China has been walking the road of "extensive, high-risk and disorderly" development, and generally has the problems of disconnection between production capacity and market demand, a wide variety of equipment, single and low degree of automation and the like. After the development of a golden decade, the coal industry is still in a valley now, and is faced with various problems such as falling coal price, decreasing sales volume and substantially reduced profit. However, as a leading energy resource in China, the demand for coal in China will still show an increase trend in the future for a long time. It is predicted that the demand for coal in China in 2015, 2020 and 2030 is 3.7 billions of tons to 3.9 billions of tons, 3.9 billions of tons to 4.4 billions of tons, and 4.5 billions of tons to 5.1 billions of tons, respectively. In view of the existing coal mining equipment in China, the automatic control of part of the functions of a single piece of equipment and the real-time monitoring of a majority of equipment have been realized. However, the manipulation of a majority of equipment still depends on manual mechanical operations. Thus, the current situation of the coal mining equipment seriously threatens the production safety of coal mines and restricts the increase of coal production.

The fully-mechanized coal mining face equipment mainly comprises a coal cutter, a hydraulic support, a scraper conveyer, a transfer machine, a crusher, a pump station and a crossheading belt conveyer. In the existing fully-mechanized coal mining face, during the whole process in which the coal falls from a coal wall and then is transported out of the coal mining face, the coal successively passes through the coal cutter, the scraper conveyer, the transfer machine, the crusher and the belt equipment to form a coal flow. Due to the certainty of the coal flow, to avoid the occurrence of coal piling or other phenomena during the starting process, the stopping process or the failure process of the fully-mechanized coal mining equipment, it is required to establish a certain start-stop order and some failure protection measures in the starting, stopping or failure process of the fully-mechanized coal mining equipment. When a coal mining face starts to work, in order to make the coal flow to pass successfully and avoid the coal piling, when the equipment is The "method for realizing a centralized control platform for large fully-mechanized coal mining face equipment" of the present invention is proposed for this purpose.

SUMMARY OF THE PRESENT INVENTION

An objective of the present invention is to provide a method for realizing a centralized control platform for large fully-mechanized coal mining face equipment in order to solve the centralized control problem of coal mining in an unmanned underground coal mining face.

For this purpose, the following specific technical solutions are employed.

A method for realizing a centralized control platform for large fully-mechanized coal mining face equipment is provided, wherein, in the method, on the basis of various subsystems, including a coal cutter system, a hydraulic support system, a coal mining face transportation system, an emulsion pump station system, a mobile transformer substation system and a video monitoring system, of the large fully-mechanized coal mining face equipment, by using a control-layer high-speed industrial control computer and a high-speed data acquisition card thereof, a front-end development platform, a database and a communication network, under the centralized coordination control of a centralized control platform, it is realized that an unmanned coal mining method is performed automatically according to the coal mining process by the subsystems of the large underground fully-mechanized coal mining face equipment;

the method for realizing a centralized control platform includes real-time monitoring, centralized coordination control and information communication network;

1) the real-time monitoring is as follows: the high-speed data acquisition card acquires information of the subsystems of the large equipment, and the information is collected and fused by the control-layer high-speed industrial control computer and then enters the control-layer high-speed industrial control computer through network communication protocol for real-time monitoring control, wherein a method for controlling real-time monitoring is as follows:

(1) the vibration of a cutting head of a coal cutter, the current and temperature of a motor and the temperature of a reduction gearbox in the coal cutter system, the temperature, oil temperature, oil level and oil pressure of a pump box, the input/output current, voltage, frequency and power of a transducer, the operation speed and operation direction of the coal cutter in the coal cutter system, and the flow, pressure and external spray flow of each portion of cooling water are monitored in real time, wherein, when a monitored value exceeds a set value, the system will give an alarm automatically and display failure information;

(2) monitoring in real time the front column pressure, rear column pressure and transition stroke of a hydraulic support in the hydraulic support system and the position of the coal cutter;

(3) the motor current and winding temperature of a scraper conveyer in the coal mining face transportation system, the oil temperature, oil level and axle temperature of the reduction gearbox, the pressure and flow of the cooling water, the pressure of an oil cylinder, and failure information of coal piling, smoke, longitudinal tear, belt breakage, slipping and tensioning of a belt portion are monitored in real time;

(4) the water supply, oil supply, oil temperature, oil level, inlet pressure, outlet pressure, liquid level and concentration of the emulsion pump station system are monitored in real time; and (5) the A/B/C phase current, voltage, leakage current and power frequency on a primary side of the mobile transformer substation system, the voltage, current and insulation resistance on a secondary side, and the electric leakage, overcurrent, short circuit, over-temperature and open-phase failure states on both the primary side and the secondary side are monitored in real time;

2) the centralized coordination control is as follows: the information transmitted from the subsystems of the large equipment is analyzed and judged by the control-layer high-speed industrial control computer, and corresponding control is performed according to the position of the coal cutter if it is judged that the subsystems of the large equipment are in the normal state, wherein a method for the centralized coordination control is as follows:

(1) when the fully-mechanized coal mining face starts to mine coal, the equipment is activated and controlled in a reverse coal flow order;

(2) dual judgment and correction of the position of the coal cutter:

the coal cutter should be located at one end of the coal mining face at the beginning of operation, and the position of the coal cutter at this time is set as an initial position; the number of chain links of the scraper conveyer walked by the coal cutter is continuously memorized during the operation of the coal cutter, so that the walking position of the coal cutter is judged; in combination with the position of the coal cutter detected by the hydraulic support system using an infrared sensor, if the walking position of the coal cutter is consistent with the position of the coal cutter detected by the hydraulic support system, the action of the corresponding hydraulic support is automatically controlled, thereby achieving automatic tracking of the coal cutter and pulling of the supports (追机拉架); if the walking position of the coal cutter is inconsistent with the position of the coal cutter detected by the hydraulic support system, an alarm is given out, and the operation of the coal cutter is stopped; and, once one reciprocating coal mining process is completed, the coal cutter returns to the initial position on the coal mining face;

(3) the centralized control platform automatically judges a coal mining process section according to the position and operation direction of the coal cutter, and then transmits a centralized control command for allowing the corresponding hydraulic support to automatically track the coal cutter to implement a corresponding action;

(4) during the coal mining process, the control-layer high-speed industrial control computer performs automatic height adjustment of a roller according to the vibration of the cutting head of the coal cutter, the oil pressure and the current of a roller motor, wherein a control scheme is a trajectory target preview control method based on memory cutting, which is realized according to a coal rock interface recognition technology with a radial basis function neural network;

(5) during the coal mining process, the control-layer high-speed industrial control computer performs automatic tension control to chain links of the scraper conveyer according to the pressure of the oil cylinder, the current of the motor of the scraper conveyer and the position of the position of the coal cuter, and an automatic tension device for chain links of the scraper conveyer is automatically controlled after the pressure of the oil cylinder, the operation current of the scraper conveyer and the coal mining position are fused;

(6) during the coal mining process, the control-layer high-speed industrial control computer automatically controls, according to the position of the coal cutter, the on and off of a camera in the video monitoring system so that the transmission of a large amount of video monitoring information is reduced; and (7) when the control-layer high-speed industrial control computer starts a coal mining operation, the operation state information of the subsystems of the large equipment is acquired to judge whether the subsystems operate normally, wherein the judgment method is as follows: an inquiry signal is transmitted to each device, each subsystem of the large equipment, upon receiving the inquiry signal, responds appointed information indicating its own state to the control-layer high-speed industrial control computer, and the control-layer high-speed industrial control computer of the centralized control platform makes a judgment and then transmits a start signal if the starting conditions are satisfied;

a. during the coal mining process, when it is detected that coal piling occurs in the scraper conveyer, the control-layer high-speed industrial control computer immediately controls an end hydraulic support in the electro-hydraulic control system to start the action of an iron claw mounted on a first-level protection side so as to quickly feed coal pile into a transfer link;

b. during the coal mining process, the centralized control platform transmits the centralized control command to an end controller of an electro-hydraulic automatic control system, and the end controller controls a support controller to perform a specific action; when it is detected that the communication with the electro-hydraulic control system of the hydraulic support is interrupted, another end controller of the electro-hydraulic control system is activated immediately, and the two end controllers take charge of the normal control over controllers on two sides of an interruption point where the interruption failure occurs;

c. during the coal mining process, the centralized control platform automatically adjusts, according to the operation status of the coal cutter, the operation speed of the coal mining face transportation system equipment; and d. during the coal mining process, when the centralized control platform judges that the inlet pressure and outlet pressure of an emulsion pump are greater than 1.1 Mpa, a reverse-washing filter is activated automatically; and 3) the information communication network is a network structure and communication mode for transmission of information between the subsystems of the large equipment and the centralized control platform, the control-layer high-speed industrial control computer and a control-layer high-speed industrial control computer for the subsystems of the large equipment utilize network communication based on a TCP/IP protocol, wherein a method for controlling the information communication network is as follows:

(1) the control-layer high-speed industrial control computer and the high-speed industrial control computers for the subsystems realize communication through the information communication network; and (2) by using the control-layer high-speed industrial control computer as a client and using each subsystem of the large equipment as a server, the control-layer high-speed industrial control computer performs one polling on all the subsystems of the large equipment every 500 ms and then provides a control quantity according to the result of polling.

In the technical solution, the coal mining face transportation system includes a scraper conveyer, a transfer machine, a crusher and a rubber belt conveyer; the control-layer high-speed industrial control computer is a high-speed embedded computer UNO-3072A; the high-speed data acquisition card is PCI-1716; the front-end development platform is PowerBuilder; the database is SQLServer; the communication protocol is Modbus TCP/IP; and, the communication network is an industrial Ethernet.

With the technical solutions of the method for realizing a centralized control platform for large fully-mechanized coal mining face equipment provided by the present invention, the automated production coal mines is realized, the gap of unmanned coal mining production in China is filled, and the foreign monopoly on this technology is broken. Compared with the prior art, the centralized control method for large underground fully-mechanized coal mining face equipment has the following advantages and positive effects.

1) There is a control function having high degree of automation which satisfies the requirements for an unmanned or few-manned coal mining face.

With the present invention, the intelligent centralized control mode of the united coordinate of multiple devices is realized, the problem that there are no channels for information communication between the devices of the fully-mechanized coal mining face is solved, a centralized control platform for large fully-mechanized coal mining face equipment is established, the centralized coordination intelligent control rules of a fully-mechanized coal mining face group control system are explored, intelligent control methods and control strategies suitable for the fully-mechanized coal mining face equipment are proposed, and the unmanned or few-manned coal mining mode of the fully-mechanized coal mining face is realized.

2) The coordinated and unified self-adaptive control functions of various systems based on the position of the coal cutter can be realized reliably.

Since the core of the fully-mechanized coal mining face equipment is the coal cutter, the operation of the coal cutter means the start of the coal mining work, and the support position and walking direction of the coal cutter determines the coal mining process stage of the coal mining work. In this method, after the position of the coal cutter is detected accurately, the centralized control over the action and operation of the corresponding equipment is automatically realized without manual intervention, so that the unmanned or few-manned fully-mechanized coal mining face mode is realized, the occurrence of safety accidents is greatly reduced and the labor productivity is improved.

3) The automatic height adjustment function of a roller is realized under the control of the centralized platform.

At present, various automatic height adjustment systems for the roller of the coal cutter realize control based on their own monitoring information; however, during the realization of automatic height adjustment of the roller of the coal cutter under the control of the centralized platform in the present invention, the height adjustment of the roller of the coal cutter is performed by comprehensively considering the operation state of each device, so that the requirements for the actual coal mining process are better satisfied.

4) The function of automatically tracking the coal cutter and pulling the supports is realized under the control of the centralized control.

In the function of automatically tracking the coal cutter and pulling the supports realized by the centralized control platform of the hydraulic support of the underground fully-mechanized coal mining face, the position of the coal cutter is judged only depending on the signals received from the infrared sensor on the coal cutter by the hydraulic support controller, and there is no correction link. However, in the function of automatically tracking the coal cutter and pulling the supports by the hydraulic support under the control of the centralized platform in the present invention, the centralized platform comprehensively takes two pieces of position information of the coal cutter respectively acquired from the hydraulic support system and acquired by calculating the number of scraper conveyer links passed by the coal cutter into consideration, so that the correctness of automatically tracking the coal cutter and pulling the supports by the hydraulic support is ensured, and the safety and reliability of the support is also ensured.

5) The function of automatically controlling tension of the chain of the scraper conveyer is realized under the control of the centralized platform.

During the coal mining process, the chain of the scraper conveyer needs to be tensioned to a certain extent in order to avoid the failure caused by too loose chain; however, after the scraper conveyer is stopped, the chain needs to be loosened to a certain extent to reduce the fatigue and deformation of the chain. In the present invention, the tension of the chain of the scraper conveyer is automatically controlled according to the pressure of the oil cylinder, the current of the motor of the scraper conveyer and the position of the coal cutter. Moreover, the isolated island of transverse information between devices can be broken through only under the centralized control platform, so that the physical information of multiple devices is effectively integrated, and the automatic tension control of the chain of the scraper conveyer is realized.

6) The real-time monitoring and real-time online processing of the failure of each device during the coal mining process can be performed, and the continuity of the coal mining production is thus ensured.

During the coal mining process, the centralized control platform can comprehensively analyze and judge the operation state of each device according the acquired information, then finds abnormality and timely starts the processing flow, so that the safe, ordered and continuous operation of the coal mining production is ensured and safety guarantee is provided for the unmanned coal mining work.

7) The operation speed of each device can be automatically adjusted according to the operation state of the coal cutter, thereby realizing energy conservation and consumption reduction.

In the present invention, the centralized control platform can judge the current coal mining process stage according to the acquired information and further automatically adjusts the power-on/power-off and operation speed of each device. For example, the operation speed of the scraper conveyer, the transfer machine and the crusher is automatically decreased when the coal cutter is stopped. Moreover, according to the position of the coal cutter, only the corresponding video camera is powered on for transmission, so that the transmission of the video camera information of the whole coal mining face is avoided. As a result, the energy is saved, and the communication speed is increased.

DETAILED DESCRIPTION OF THE PRESENT INVENTION

The method for realizing a centralized control platform for large fully-mechanized coal mining face equipment of the present invention will be further described below in details by specific implementations taken with reference to the accompanying drawings. Upon reading the specific implementations, by using the existing equipment and in combination with the prior art, those skilled in the art can realize a method for controlling the centralized control platform for large fully-mechanized coal mining face equipment of the present invention and can also realize the positive effects of the present invention.

The method for realizing a centralized control platform for large fully-mechanized coal mining face equipment is implemented on the basis of large underground fully-mechanized coal mining face equipment, including a high-speed embedded computer UNO-3072A, a high-speed data acquisition card PCI-1716, a PowerBuilder front-end development platform, an SQLServer database, a Modbus TCP/IP communication protocol and an industrial Ethernet.

Figure 1:
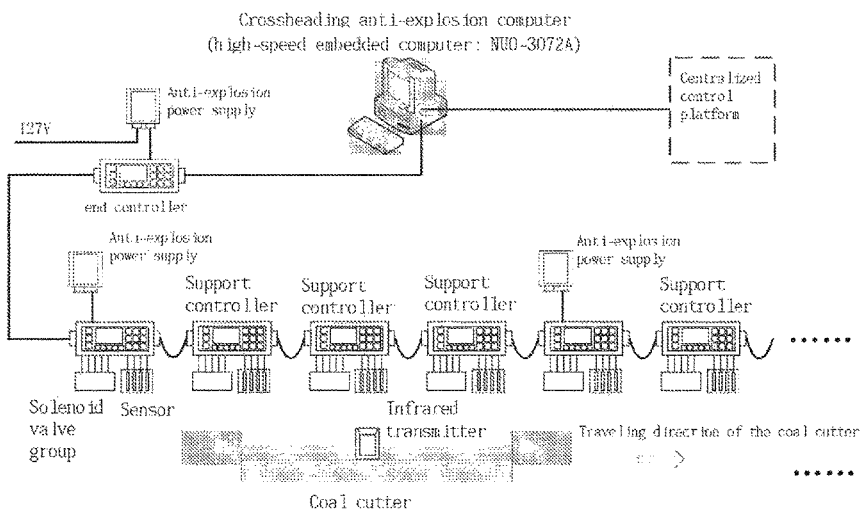
FIG. 1 is a structural diagram of a centralized control platform for a fully-mechanized coal mining face according to the present invention.

The centralized control platform for large fully-mechanized coal mining face equipment controls seven systems, i.e., a coal cutter system, a hydraulic support system, a coal mining face transportation system, a pump station system, a power supply system and a video monitoring system, as structurally shown in FIG. 1.

A server uses the high-speed embedded computer UNO-3072A to perform human-machine interaction so as to realize the state display and real-time control of the working condition of each fully-mechanized coal mining face equipment and the unmanned cooperative operation of the equipment. The server is developed by the PowerBuilder front-end development platform. The controller for each subsystem of the fully-mechanized coal mining face is realized by the high-speed embedded computer UNO-3072A and the high-speed data acquisition card PCI-1716, and is the monitoring and control object of the centralized control system of the fully-mechanized coal mining face. The whole centralized control system of the fully-mechanized coal mining face uses monitoring as its basis, controlling cooperative work as its core and communication as its key.

The monitoring function is the basis of the centralized control system of the fully-mechanized coal mining face. The centralized control system of the fully-mechanized coal mining face needs to acquire the operation state of each device from each subsystem, and then realizes the coordinated control and protection function among devices according to the monitored information. Each subsystem has an independent intelligent processing system including signal acquisition and intelligent control modules. Each subsystem can perform autonomous control in a non-centralized control state. The hardware of each subsystem comprises the high-speed embedded computer UNO-3072A and the high-speed data acquisition card PCI-1716A. The PCI-1716A can acquire 16 paths of analog signals and 16 paths of digital signals, and can output 2 paths of analog control signals and 16 paths of digital control signals.

1. Monitoring Portion

1) Since the coal cutter is a core device of the fully-mechanized coal mining face, the operation state of the coal cutter directly reflects the coal mining efficiency. Therefore, it is required to comprehensively monitor the operation state of the coal cutter. The monitoring information of the coal cutter mainly includes: the vibration of a cutting head; the currents and the temperature of five motors; the temperature of a reduction gearbox; the temperature, oil temperature, oil level and oil pressure of a pump box; the input/output current, voltage, frequency and power of a transducer; the operation speed and operation direction of the coal cutter; the flow, pressure and the left/right external spray flow of each portion of cooling water; and the like. When the monitored value exceeds a set value, the system will give an alarm automatically and display failure information. The vibration of the cutting head, the oil pressure and the current of the roller motor are the signal basis for controlling the coal cutter, and the roller memory trajectory is to be tracked and controlled during the control process, so it is required to correctly monitor the roller height and the angle of inclination of the coal cutter, so that it is convenient for real-time adjusting the memory trajectory. In the present invention, a roller angle is obtained by a rotary encoder so as to obtain the roller height, and the roller height can also be obtained by an oil cylinder stroke position sensor, so that the two obtained roller height values can be validated by each other. Meanwhile, the angle of inclination of the coal cutter is obtained by an electric inclinometer.

2) As a key device of the fully-mechanized coal mining face, hydraulic supports play an important role in supporting and propelling the coal mining face. Although the hydraulic support has few detectable quantities, there are a large number of coal mining face supports. The monitoring information of a single hydraulic support mainly includes front column pressure, rear column pressure, transition stroke, and the position of the coal cutter, wherein the position of the coal cutter is the basis of controlling the action of the hydraulic support.

3) The coal mining face transportation system transports coal from the coal mining face to a crossheading belt conveyer. Key components of the scraper conveyer are a motor and a reduction gearbox, and the two key components need to be monitored. The quantities to be monitored include the current and winding temperature of the motor, the oil temperature, oil level, axle temperature and the like of the reduction gearbox, the pressure and flow of the cooling water, and the pressure of the oil cylinder, wherein the pressure of the oil cylinder, the current of the motor of the scraper conveyer and the position of the coal cutter are the basis of the automatic tension control of the chain of the scraper conveyer.

4) As an important part of the underground transportation system, the belt conveyer is located in the crossheading and has a long conveying distance. The controllable belt conveyer in the centralized control system of the fully-mechanized coal mining face is only a belt conveyer closest to the fully-mechanized coal mining face, and the belt conveyer mainly consists of a motor and a belt. For the motor, only the current and temperature of the motor are monitored; while for the belt, the coal piling, smoke, longitudinal tear, belt breakage, slipping, tensioning or other important failures of the belt are mainly monitored, wherein the tensioning is the basis of controlling the tension of the belt conveyer.

5) As a power source of the hydraulic system, the emulsion pump station is the strong guarantee for propelling the coal mining face. The pressure of the pump station and the quality of the emulsion directly determine the operation stability of the hydraulic system of the fully-mechanized coal mining face. The water supply, oil supply, oil temperature, oil level, inlet pressure, outlet pressure, liquid level and concentration of the emulsion pump need to be monitored, wherein the water supply, the oil supply, the liquid level, the concentration, the inlet pressure and the outlet pressure are the basis of automatically controlling the proportion of the emulsion and automatically activating a reverse-washing filter.

6) The mobile transformer substation is used for supplying electricity for the fully-mechanized coal mining equipment and is an essential part of the underground fully-mechanized coal mining. The important monitor positions of the mobile transformer substation are located on a primary side and a secondary side. On the primary side, the A/B/C phase current, high voltage, leakage current and power frequency are to be monitored; on the secondary side, low voltage, current and insulation resistance are to be monitored; and, on both the primary side and the secondary side, the electric leakage, overcurrent, short circuit, over-temperature, open phase and other failures need to be monitored.

2. Control Portion

1) At the beginning of coal mining, the fully-mechanized coal mining face is started in the reverse coal flow order. The industrial control computer acquires the state information of all devices through the acquisition card and then makes a judgment. If the working conditions are satisfied, the belt, the crusher, the transfer machine, the scraper conveyer and the coal cutter are successively activated in the reverse coal flow order.

2) The coal cutter should be located on one end of the coal mining face before activation. In this case, the position of the coal cutter is set as 0, i.e., an initial position. During the operation of the coal cutter, the number of chain links of the scraper conveyer passed by the coal cutter is continuously memorized, so that the position of the coal cutter can be determined, that is, the coal cutter is located at which support, which is the basis for determining the position of the coal cutter. Meanwhile, the position distance of the coal cutter is also detected by the hydraulic support system through an infrared sensor. If the both positions are consistent, the action of the corresponding hydraulic support is automatically controlled, thereby automatically tracking the coal cutter and pulling the supports. If the both positions are inconsistent, an alarm is given out, and the operation of the coal cutter is stopped. In order to reduce the position error resulted from the calculated number of chain links of the scraper conveyer passed by the coal cutter, once one reciprocating coal mining process is completed, the coal cutter returns to the initial end of the coal mining face, and the position of the coal cutter is set as 0.

3) The centralized control platform automatically judges a coal mining process stage according to the position and operation direction of the coal cutter, and then transmits a centralized control command for allowing the corresponding hydraulic support to automatically track the coal cutter to implement a corresponding action. In accordance with the production process requirements for the coal mining, the fully-mechanized coal mining face has 14 process stages, including a middle stage, a curved stage and the whole process of cutting triangle coal at two ends. Depending on different lengths of coal mining faces, the number of supports is different, and the number of supports in the middle stage, the curved stage and the position of cutting triangle coal at two ends is also different. In order to enable the method of the present invention to satisfy the requirements of different coal mining faces, the centralized control platform of the present invention can receive control parameters (including the number of coal mining face supports, the limited time of action, the maximum column pressure, the maximum stroke of the hydraulic support, the length of the coal cutter and the like) maintained by the hydraulic support system and then automatically calculate the serial numbers of the starting support and the ending support at two ends, so that the automatic control over fully-mechanized coal mining face hydraulic supports of different lengths can be automatically adapted. In the present invention, by taking a coal mining face having 122 hydraulic supports as example, in the centralized platform, supports for tracking the action of the coal cutter are totally 30 hydraulic supports, i.e., a support where the coal cutter is located, 14 supports before the coal cutter and 15 supports after the coal cutter, so that the automatic coal cutter tracking and support pulling is realized. The control process refers to Embodiment 1.

4) An automatic adjustment control scheme for the height of a roller of the coal cutter in the present invention is a trajectory target preview control method based on memory cutting, which is realized according to a coal rock interface recognition technology with a radial basis function (RBF)

neural network. The RBF neural network has strong parallel processing and nonlinear mapping capacity and can be well suitable for recognition of a coal rock interface. Therefore, in the present invention, the automatic coal cutter height adjustment preview control method based on memory cutting having RBF neural network coal rock interface recognition is employed. Meanwhile, during the automatic adjustment process of the height of the roller of the coal cutter, the current height of the roller of the coal cutter and the nature of the coal rock to be cut currently need to be known. Therefore, in the present invention, multiple pieces of physical information are effectively combined by the D-S evidence theory. The control process refers to Embodiment 1.

(5) During the coal mining process, the control-layer high-speed industrial control computer performs automatic tension control of the scraper conveyer chain according to the pressure of the oil cylinder, the current of the motor of the scraper conveyer and the position of the coal cuter, and an automatic tension device for chain links of the scraper conveyer is automatically controlled by multiple variables and is controlled after comprehensively judging parameters such as the pressure of the oil cylinder, the operation state (operation current) of the scraper conveyer and the coal mining position. The control process refers to Embodiment 1.

6) During the coal mining process, the control-layer high-speed industrial control computer automatically controls, according to the position of the coal cutter, the on and off of a camera in the video monitoring system, so that effective video monitoring information can be acquired, the electric energy can be saved and the transmission of a large amount of video monitoring information can be reduced.

7) During the coal mining process, the control-layer high-speed industrial control computer can realize the coordinated control over the whole coal mining face equipment, so that the bottleneck problems that the operation state of each device becomes an isolated information island due to the absence of transverse communication among devices of the coal mining face and the unmanned intelligent coordinated operation cannot be realized are solved.

(1) When the control-layer high-speed industrial control computer starts a coal mining operation, the operation state information of each device is acquired to judge whether the device operate normally, wherein the judgment method is as follows: an inquiry signal is transmitted to each device, each device, upon receiving the inquiry signal, responds appointed information indicating its own state to the control-layer high-speed industrial control computer, and the control-layer high-speed industrial control computer of the centralized control platform makes a judgment and then transmits a start signal if the starting conditions are satisfied. The start process is as described above.

(2) During the coal mining process, when it is detected that coal piling occurs in the scraper conveyer, generally at the head portion of the scraper conveyer, the control-layer high-speed industrial control computer immediately controls an end hydraulic support in the hydraulic control system to start the action of an iron claw mounted on a first-level protection side so as to quickly feed coal pile into a transfer link, so that the continuity of the coal mining production is ensured.

(3) During the coal mining process, the centralized control platform transmits a centralized control command to an end controller of an electro-hydraulic automatic control system, and the end controller controls a support controller to perform a specific action; when it is detected that the communication with the electro-hydraulic control system of the hydraulic support is interrupted, another end controller of the electro-hydraulic control system will be activated immediately, and the two end controllers take charge of the normal control over controllers on two sides of an interruption point where the interruption failure occurs, so that continuity of the coal mining production is ensured.

(4) During the coal mining process, the centralized control platform automatically adjusts, according to the operation status of the coal cutter, the operation speed of the coal mining face transportation system, so that the electric energy is saved to the largest extent.

(5) During the coal mining process, when the centralized control platform judges that the inlet pressure and outlet pressure of an emulsion pump are greater than 1.1 Mpa, a reverse-washing filter is activated automatically, so that the normal operation of the emulsion pump is ensured and the continuity of the coal mining production is thus ensured.

3. Network Architecture

1) The control-layer high-speed embedded computer UNO-3072A and the high-speed embedded computer UNO-3072A for each subsystem realize TCP/IP protocol based network communication.

2) The control-layer high-speed industrial control computer realizes the TCP/IP protocol based network communication by using a PowerBuilder external object (OLE) quote Winsock. Since the control-layer high-speed industrial control computer serves as the party B, i.e., a client, the following sentences should be added into an Open event of a PowerBuilder front-end development software window:

set the ole_I.object.protocol=0//winsock communication protocol is set as the TCP protocol;

ole_I.object.remotehost="219.226.96.151"//ip address of the opposite party;

ole_I.object.remoteport=502//winsock communication port of the opposite party to be contacted; and ole_I.object.connect( )//send a connection request.

The control-layer high-speed industrial control computer performs one polling on all the systems every 500 ms and then provides a control quantity according to the result of polling.

3) In the TCP/IP communication, each system serves as the party A, i.e., a server, which has an ocx_error event script for monitoring the failure of communication with the centralized control platform. Once an interruption failure occurs, reconnection is performed immediately, so that the stability and reliability of data communication are ensured.

ole_I.object.close( );

set the ole_I.object.protocol=0//winsock communication protocol is set as the TCP protocol;

ole_I.object.localport=502//local winsock communication port No.;

ole_I.object.listen( ) and sle_I.text="TCP/IP communication error, reconnected!".

Embodiment 1

In the present invention, the centralized control over the large underground fully-mechanized coal mining face equipment is realized by a high-speed embedded computer UNO-3072A, a high-speed data acquisition card PCI-1716, a PowerBuilder front-end development platform, an SQLServer database, a Modbus TCP/IP communication protocol and an industrial Ethernet. The specific implementation is as follows.

1. FIG. 1 shows a hardware connection diagram of the centralized control platform. Each of the centralized control platform and the systems includes a high-speed embedded computer UNO-3072A, a high-speed data acquisition card PCI-1716, a high-speed embedded computer application PowerBuilder front-end development platform and a SQLServer database. The systems and the centralized control platform perform information transmission through the Modbus TCP/IP communication protocol and the industrial Ethernet.

Figure 2:
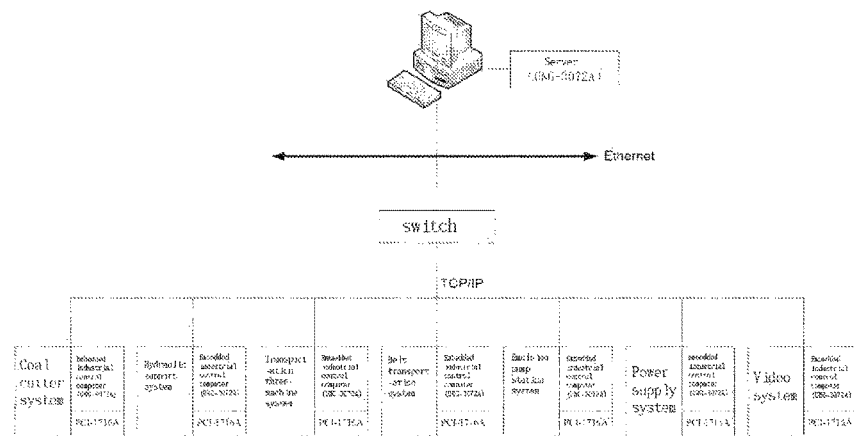
FIG. 2 is a structural diagram of automatic coal cutter tracking and support pulling control in an electro-hydraulic control system according to the present invention.
Figure 3:
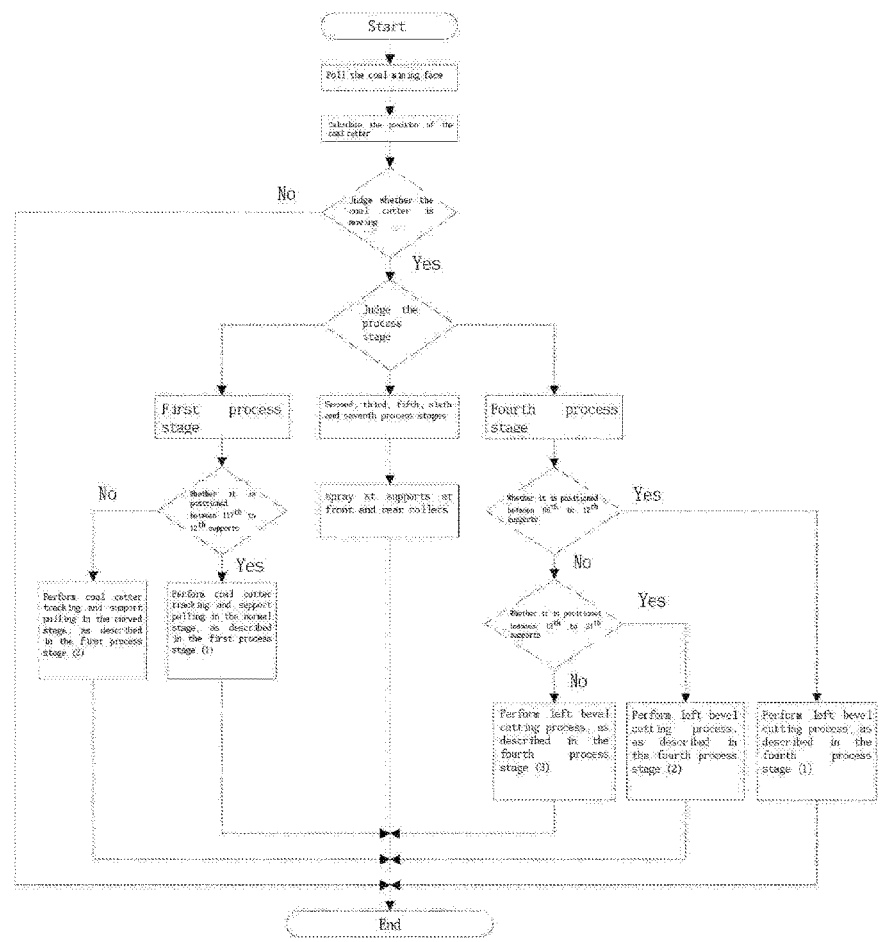
FIG. 3 is a flowchart of automatic coal cutter tracking and support pulling control in the electro-hydraulic control system according to the present invention.

2. The centralized control platform automatically judges the coal mining process stage according to the position and operation direction of the coal cutter and then transmits a centralized control command to allow the corresponding hydraulic support to automatically track the coal cutter to perform the corresponding actions. FIG. 2 shows the structure of automatic coal cutter tracking and support pulling control in the electro-hydraulic control system. In accordance with the requirements for the production process of coal mining, supports for tracking the action of the coal cutter in this system are totally 30 hydraulic supports, i.e., a support where the coal cutter is located, 14 supports before the coal cutter and 15 supports after the coal cutter, thereby realizing automatic tracking of the coal cutter and pulling of the supports. The control flow is shown in FIG. 3, and the specific control process is as follows (by taking 122 supports as example).

1) First Process Stage—Normally Cutting Coal (Leftward) Support 177→Support 06:

(1) When the coal cutter travels leftward from the $177^{th}$ support to the $12^{th}$ support, the coal cutter tracking and support pulling operation in the normal stage will be performed. The action procedure will be described in the case where the coal cutter is positioned on the $54^{th}$ support. The procedure is as follows.

If the coal cutter travels to the $54^{th}$ support, an action of folding first-level protection side needs to be performed ahead of 6 supports, that is, the action of folding first-level protection side is performed on the $48^{th}$ support. Since spraying is to be performed on front and rear rollers of the coal cutter for lowering dust, a spraying action is performed on the $50^{th}$ support and the $58^{th}$ support. Small circulation actions need to be performed on a $8^{th}$ support behind the central position of the coal cutter, that is, five actions of lowering the column, lifting the base, pulling the support, lifting the column and extending the protection side need to be performed on the $62^{nd}$ support. A scraper conveyer pushing action needs to be performed on a $12^{th}$ support behind the central position of the coal cutter, that is, the scraper conveyer pushing action is performed on the $66^{th}$ support.

(2) When the coal cutter travels leftward from the $11^{th}$ support to the $6^{th}$ support, the curved stage needs to be pushed out. The action procedure will be described in the case where the coal cutter is positioned on the $8^{th}$ support. The procedure is as follows.

Since the length of the curved stage is 10 supports, the curved stage needs to be pushed out in batches by 10 supports. When the coal cutter travels to the $8^{th}$ support, the action of folding first-level protection side needs to be performed ahead of 6 supports, that is, the action of folding first-level protection side is performed on the $2^{nd}$ support. Since spraying is to be performed on front and rear rollers of the coal cutter for lowering dust, a spraying action is performed on the $4^{th}$ support and the $12^{th}$ support. Small circulation actions need to be performed on a $8^{th}$ support behind the central position of the coal cutter, that is, five actions of lowering the column, lifting the base, pulling the support, lifting the column and extending the protection side need to be performed on the $16^{th}$ support. A scraper conveyer pushing action needs to be performed on a $12^{th}$ support behind the central position of the coal cutter, that is, the scraper conveyer pushing action in the curved stage is performed on the $20^{th}$ support at 7/10. Before this, the scraper conveyer pushing action has been performed on the $23^{rd}$ support, the $22^{nd}$ support and the $21^{st}$ support at 10/10, 9/10 and 8/10, respectively.

2) Second Process Stage—Left Bottom Sweeping Knife 1 (Leftward) Support 6→Support 10:

After coal cutter cuts the coal till the machine head and cuts through the coal wall, the coal cutter travels towards the machine tail and performs a bottom coal sweeping operation. During this process, spraying is performed on the supports at the front and rear rollers.

3) Third Process Stage—Left Bottom Sweeping Knife 1 (Leftward) Support 10→Support 6:

The coal cutter travels towards the machine head and performs a bottom coal sweeping operation. During this process, spraying is performed on the supports at the front and rear rollers.

4) Fourth Process Stage—Left Bevel Cutting (Rightward) Support 6→Support 30:

(1) When the coal cutter travels rightward from the $6^{th}$ support to the $13^{th}$ support, the spraying action above the front and rear rollers of the coal cutter and the action of folding first-level protection side ahead of 6 supports are performed on the supports.

(2) When the coal cutter travels rightward from the $13^{th}$ support to the $21^{st}$ support, a support advancing action is performed on the supports. The action procedure will be described in the case where the coal cutter is positioned on the $16^{th}$ support. The procedure is as follows.

If the coal cutter travels to the $16^{th}$ support, an action of folding first-level protection side needs to be performed ahead of 6 supports, that is, the action of folding first-level protection side is performed on the $22^{nd}$ support. Since spraying is to be performed on front and rear rollers of the coal cutter for lowering dust, a spraying action is performed on the $20^{th}$ support and the $12^{th}$ support. Small circulation actions need to be performed on a $8^{th}$ support behind the central position of the coal cutter, that is, five actions of lowering the column, lifting the base, pulling the support, lifting the column and extending the protection side need to be performed on the $8^{th}$ support.

(3) When the coal cutter travels rightward from the $22^{nd}$ support to the $30^{th}$ support, an action of pushing rings in group is performed on the supports. The procedure is as follows.

When the coal cutter travels to the $23^{rd}$ support, the action of pushing rings in group is performed on the first to fifth supports. When the coal cutter travels to the $24^{th}$ support, the action of pushing rings in group is performed on the sixth to tenth supports. When the coal cutter travels to the $26^{th}$ support, the action of pushing rings in group is performed on the $11^{th}$ to $15^{th}$ supports. When the coal cutter travels to the $28^{th}$ support, the action of pushing rings in group is performed on the $16^{th}$ to $20^{th}$ supports. When the coal cutter travels to the $30^{th}$ support, the action of pushing rings in group is performed on the $21^{st}$ to $23^{rd}$ supports. When the coal cutter travels from the $24^{th}$ support to the $27^{th}$ support, small circulation actions are performed on the first to fourth supports once, respectively.

5) Fifth Process Stage—Left Cutting Triangle Coal (Leftward) Support 30→Support 6:

The coal cutter returns to exchange the roller, and then starts to cut triangle coal. When the coal cutter cuts the coal till the machine head and cuts through the coal wall, spraying is performed on supports at the front and rear rollers.

6) Sixth Process Stage—Left Bottom Sweeping Knife 2 (Rightward) Support 6→Support 10:

After coal cutter cuts the coal till the machine head and cuts through the coal wall, the coal cutter travels towards the machine tail and performs a bottom coal sweeping operation. During this process, spraying is performed on the supports at the front and rear rollers.

7) Seventh Process Stage—Left Bottom Sweeping Knife 2 (Leftward) Support 10→Support 6:

The coal cutter travels towards the machine head and performs a bottom coal sweeping operation. During this process, spraying is performed on the supports at the front and rear rollers.

8) The $8^{th}$ to $14^{th}$ process stages are similar to the $1^{st}$ to $8^{th}$ process stages.

3. The automatic control scheme for the height of the roller of the coal cutter is a trajectory target preview control method based on memory cutting, which is realized according to the coal rock interface recognition technology with a radial basis function neural network. The steps are as follows:

1) The control quantity of the roller of the coal cutter is obtained by the optimal preview control principle.

A kinetic model and a mathematical model of a coal cutter height adjustment mechanism for adjusting height of the hydraulic cylinder are employed. As shown in FIG. 1, height adjustment rocker arms of the coal cutter height adjustment mechanism can be regarded as a rigid body rotating about a fixed point, and the height adjustment oil cylinder can be equivalent to a hydraulic damping spring, i.e., a mass vibration system, so that the following expression can be obtained:

$$J\ddot{\theta}+k_h \cdot x \cdot l \sin \Phi_2+c_h \dot{x} \cdot l \sin \Phi_2=\Sigma M \qquad (1)$$

where J is the moment of inertia of the roller and the rocker arms about the point o (kg·m2);

$\ddot{\theta}$ is the angular acceleration of rotation of the rocker arms about the point o (rad/s2);

$k_h$ is the stiffness of the hydraulic spring of the oil cylinder (N·m−1);

$c_h$ is the hydraulic viscous damping coefficient of the oil cylinder (Pa·S);

x is the displacement of the oil cylinder (m);

$\dot{x}$ is the movement speed of the oil cylinder (m/s)

l is the length of the small rocker arm (m);

$\Phi_2$ is the included angle between the small rocker arm and the piston rod of the oil cylinder (rad); and $\Sigma M_o$ is the sum of all moments of external force applied to the point o (N·m).

The moments of external force applied to the point o include:

moment of resistance $R_a \sin \omega_a t \cdot L \cos \Phi_1$ and $R_b \sin \omega_b t \cdot L \sin \Phi_1$;

the kinetic moment (which is determined by the electromagnetic current of the servo valve) applied to the piston by the hydraulic oil:

$k_f \cdot i_f \cdot l \sin \Phi_2$; and the centrifugal moment generated by the eccentric mass of the roller: $me\omega_2 \sin \omega t \cdot L \cos \Phi_1$ and $me\omega_2 \cos \omega t \cdot L \sin \Phi_1$.

These moments are substituted into formula (12):

$$J\ddot{\theta}+k_h \cdot x \cdot l \sin \Phi_2+c_h \dot{x} \cdot l \sin \Phi_2 = R_a \sin \omega_a t \cdot L \cos \Phi_1 + R_b \sin \omega_b t \cdot L \sin \Phi_1 + k_f i_f \cdot l \sin \Phi_2 + me\omega_2 \sin \omega t \cdot L \cos \Phi_1 + me\omega_2 \cos \omega t \cdot L \sin \Phi_1 \qquad (2)$$

where L is the length of the large rocker arm (m);

$\Phi_1$ is the included angle of the large rocker arm relative to the horizontal plane (rad);

$k_f$ is the electromagnetic coefficient (N/A);

$i_f$ the electromagnetic current (A);

m is the eccentric mass resulted from the machining, mounting, pick arrangement and other factors of the roller (kg);

e is the eccentric distance resulted from the machining, mounting, pick arrangement and other factors of the roller (m); and ω is the angular speed of the roller (rad/s).

When the displacement x of the hydraulic cylinder is $l \sin \theta$ and when the tilt angle θ of the rocker arm about the point o is small, it is approximately considered that $x=l \cdot \theta$, so that the movement speed of the oil cylinder satisfies $\dot{x}=l \cdot \dot{\theta}$; and the moment of inertia of the roller and the rocker arms about the point o is:

$$J = m_1 L^2 + \frac{M_2 L^2}{3} + \frac{(3m_1+m_2)L^2}{3}$$

When it is substituted into formula (2):

$$\frac{1}{3}[(3m_1+m_2)L^2]\ddot{\theta}+k_h l^2 \theta \sin \Phi_2 + c_h l^2 \sin \Phi_2 = \qquad (3)$$
$$R_a \sin \omega_a t \cdot L \cos \Phi_1 + R_b \sin \omega_b t \cdot L \sin \Phi_1 + k_f \cdot i_f \cdot l \sin \Phi_2 +$$
$$me\omega_2 \sin \omega t \cdot L \cos \Phi_1 + me\omega_2 \cos \omega t \cdot L \sin \Phi_1$$

where $m_1$ is the concentrated mass of the roller (kg); and $m_2$ is the concentrated mass of the rocker arms (kg).

It is analyzed from the document that $\omega_a=\omega_b=\omega$, and it is sorted to obtain:

$$\ddot{\theta}+A_1 c_h \dot{\theta}+A_1 k_h \theta = A_2 \sin(\omega t+\psi)+A_3 \cdot i_f \qquad (4)$$

where:

$$A_1 = \frac{3 \cdot l_2 \sin \Phi_2}{(3m_1+m_2)L^2};$$

$$A_2 = \frac{3}{(3m_1+m_2)L}\left[(R_a \cos \Phi_1 + R_b \sin \Phi_1 + me\omega^2 \cos \Phi_1)^2 + me\omega^2 \sin \Phi_1)^2\right]^{\frac{1}{2}}$$

$$\psi = \arctg \frac{R_a \cos \Phi_1 + R_b \sin \Phi_1 + me\omega^2 \cos \Phi_1}{me\omega^2 \sin \Phi_1};$$

$A_3 = K_f \cdot l \sin \Phi_2 \circ$ $A_3 = Kf \cdot l \sin \Phi_2$.

If $A_2 \sin(\omega t+\psi)=d(t)$, it is called a disturbance, so that $$\ddot{\theta}+A_1 c_h \dot{\theta}+A_1 k_h \theta = A_3 \cdot i_f + d(t) \qquad (5)$$

If $$\begin{cases} x_1 = \theta \\ x_2 = \dot{\theta} \end{cases},$$

the obtained state equation of the system is:

$$\dot{X}(t)=AX(t)+Bi_f(t)+Ed(t)$$

$$y(t)=CX(t)$$

where $$A = \begin{bmatrix} 0 & 1 \\ -A_1 k_n & -A_1 C_n \end{bmatrix}, B = \begin{bmatrix} 0 \\ A_3 \end{bmatrix}, E = \begin{bmatrix} 0 \\ 1 \end{bmatrix}$$

$C=[1\ 0]$

A zero-order holder is used, and the sampling period is T. Formula (6) is discretized to obtain:

$$X(k+1)=AX(k)+Bi_f(k)+Ed(k)$$

$$Y(k)=CX(k) \qquad (7)$$

where:

$$A = e^{A_c T} = \sum_{n=0}^{\infty} \frac{A_c^n T^n}{n} \qquad (8)$$

$$B = \int_0^T e^{A_c \tau} d\tau H_c = \sum_{n=0}^{\infty} \frac{A_c^n T^{n+1}}{(n+1)!} B_c$$

$$E = \int_0^T e^{A_c \tau} d\tau D_c = \sum_{n=0}^{\infty} \frac{A_c^n T^{n+1}}{(n+1)!} D_c$$

$$C = [1\ 0]$$

It is assumed that the system is controllable and observable, and r≥m. If the target value is assumed as R(k)(m×1) and the error signal is defined as e(k)=R(k)−y(k), the following equation can be obtained by the formula (7):

$$\begin{vmatrix} e(k+1) \\ \Delta x(k+1) \end{vmatrix} = \qquad (9)$$

$$\begin{vmatrix} I_m & -CA \\ 0 & A \end{vmatrix} \begin{vmatrix} e(k) \\ \Delta x(k) \end{vmatrix} + \begin{vmatrix} -CB \\ B \end{vmatrix} \Delta u(k) + \begin{vmatrix} I_m \\ 0 \end{vmatrix} R(k+1) + \begin{vmatrix} -CE \\ B \end{vmatrix} \Delta d(k)$$

or it is expressed as:

$$X_0(k+1)=\Phi X_0(k)+G\Delta u(k)+G_R \Delta R(k+1)+G_d \Delta d(k) \qquad (10)$$

The system expressed by the formula (10) is called a generalized error system. If it is assumed that the target values from the current moment (it is assumed that k=1) to the further step $M_R$ are known, it means that the control output u(k) must change before the step $M_R$ in order to allow the output y(k) to track the current target value R(k), that is, the step $M_R$ preview control. For the generalized error system of the formula (3), the quadratic performance index of the formula (11) is defined as:

$$J = \sum_{K=-M_R+1}^{\infty} [e^T(k)Q_e(k) + \Delta u^T(k)H\Delta u(k)] = \qquad (11)$$

$$\sum_{K=-M_R+1}^{\infty} [X_0^T(k)QX_0(k) + \Delta u^T(k)H\Delta u(k)]$$

where Q is a positive semidefinite matrix, and $Q_e$ and H are positive definite matrixes.

It is known from the optimal control theory that the formula (11) has the following optimal input forms:

$$\Delta u(k) = F_0 X_0(k) + \sum_{j=0}^{M_R} F_R(j)\Delta R(k+j) + \sum_{j=0}^{M_R} F_d(j)\Delta d(k+j) \qquad (12)$$

where $F_0 X_0$ is the optimal solution of the full stage feedback;

$$F_0=-[H+G^T PG]^{-1} G^1 P\Phi \qquad (13)$$

P is a solution of the following Riccati equation:

$$P=Q+\Phi^T P\Phi-\Phi^T PG[H+G^T PG]^{-1} G^T P\Phi \qquad (14);\text{ and}$$

the second and third items on the right of the formula (12) are preview feed-forward compensations using the target value information and interference information from the current moment k to the further step $M_R$.

If only the target value preview is taken into consideration, $F_R(j)$ can be solved by assuming $\Delta d(k+j)=0$; and, if only the interference preview is taken into consideration, similarly, $F_d(j)$ can be solved by assuming $\Delta R(k+j)=0$.

Only the target value preview needs to be studied now as desired. Since the memory tracking cutting is to be controlled, $\Delta d(k+j)=0$, and the formula (12) is substituted into the formula (11). If it is assumed that the target value changes from the current moment (k=1), $\Delta R(1)=R_0$, and then:

$$F_{RR} = \begin{vmatrix} F_R(0) \\ F_R(1) \\ \cdots \\ F_R(M_R) \end{vmatrix}, \Delta_{RR} = \begin{vmatrix} 0 \\ G_R^T P G_R \\ \cdots \\ G^T \xi^T M_R^{-1} P G_R \end{vmatrix}, \Gamma = \text{diag}\{H + G^T PG\}$$

Since $F_{RR}$ must satisfy the following equation when the performance index J is minimal:

$$\frac{\partial J}{\partial F_{RR} R_0} = [2\Gamma_{RR} F_{RR} + 2\Delta_{RR}]R_0 = 0$$

It can be obtained that $F_{RR}=\Gamma_{RR}^{-1}\Delta_{RR}$. The preview feed-forward coefficient $F_R(j)$ is obtained by the following formula:

$$F_R(0)=0$$

$$F_R(j)=-[H+G^T PG]^{-1} G^T (\zeta^T)^{j-1} PG_R$$

$$j=1,\ldots,M_R$$

If it is assumed that the height memory trajectory (i.e., target trajectory) of the roller of the coal cutter is H(t), it can be inferred from the above analysis of the structurally mathematical model that the target value of the tilt angle of the small rocker arm is R(t), and the output error is e(k)=R(k)−y(k)=R(k)−CX(k), wherein the control rule is:

$$\Delta u(k) = \Delta i_f(k) = F_0 e(k) + \sum_{j=0}^{M_R} F_R(j)\Delta R(k+j) + \sum_{j=0}^{M_R} F_d(j)\Delta d(k+j) \qquad (15)$$

In accordance with the researches of the inventor(s), only the target value preview is taken into consideration, and $\Delta d(k+j)=0$. The feed-forward coefficient $F_R(j)(J=1, \ldots, M_R)$ obtained by the preview control is substituted into the formula (15) to obtain $F_O$ and $F_R(j)$, i.e., $\Delta i_f(k)$, and the magnitude of the control current is also obtained. For an output as a digital switch signal, $\Delta i_f(k)$ can be converted into the duration of feeding liquid, and $M_R$ is the number of previewed steps.

2) Coal rock interface recognition is performed by the RBF neural network.

The structure of the RBF neural network has three layers, i.e., an input layer, an output layer and a hidden layer.

In the hidden layer, the following Gaussian function is used as a primary function of the RBF neural network:

$$\Phi(X, X_i) = \exp\left(-\frac{1}{2\sigma_i^2}\|x - x_i\|^2\right) = \exp\left[-\frac{1}{2\sigma_i^2}\sum_{k=1}^{P}(x_k - x_{ik})^2\right] \quad (16)$$

so that:

$$f(X) = \sum_{i=1}^{N} \omega_i \exp\left(-\frac{1}{2\sigma_i^2}\|x - x_i\|^2\right) \quad (17)$$

In this way, the parameters of the RBF neural network includes the output unit weight $\omega_i$, the center $x_i$ of the hidden unit and the function width $\sigma$.

In the present invention, the training of the output unit weight of is calculated directly by the least square method, and the two latter parameters are selected by K-mean clustering. Samples are clustered into M classes, and the class center is used as the center of the RBF, and the function width is further determined.

Figure 4:
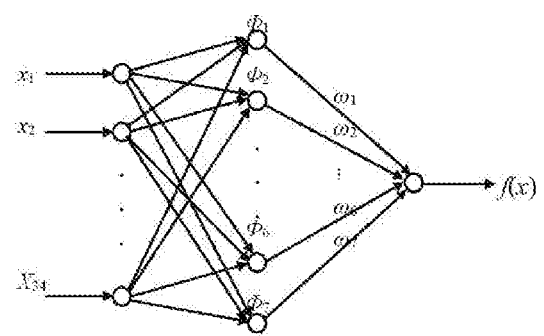
FIG. 4 is a structural diagram of a RBF neural network for coal rock interface recognition according to the present invention.

In the present invention, energy characteristic values of 20 frequency bands of the vibration signal from the cutting head of the coal cutter, energy characteristic values of 8 frequency bands of the oil pressure signal and energy characteristic values of 6 frequency bands of the current signal of the roller motor are used as the input of the RBF neural network, and the samples are clustered to obtain the center of the primary function. The currently cut coal rock situation can be judged by these signals. In the experiments, the inventor has extracted seven samples, i.e., 100% coal; 80% coal, 20% rock; 70% coal, 30% rock; 50% coal, 50% rock; 30% coal, 70% rock; 20% coal, 80% rock; 0% coal and 100% rock. The corresponding characteristic vectors are classified by clustering, the result 7 of clustering of the coal rock samples are used as the number of hidden units, and the corresponding characteristic vectors are used as the center xi of the corresponding hidden units. The seven states will be predicted in classes of 0, 1, 2, 3, 4, 5 and 6 to serve as output. In this way, the RBF neural network having 34 inputs, 1 output and 7 hidden units will be obtained to serve as a coal rock interface recognition model, as shown in FIG. 4, wherein x1, x2, . . . , x20 are signal characteristic quantities extracted from the vibration signal after wavelet packet analysis, x21, x2, . . . , x26 are signal characteristic quantities extracted from the oil pressure signal after wavelet packet analysis, x27, x2, . . . , x34 are signal characteristic quantities extracted from the current signal of the roller motor after wavelet packet analysis, Φ1, Φ1, . . . , Φ7 are hidden layers of the RBF neural network. The primary function is a Gaussian function, and f(x) is the output result of the coal rock proportion.

3) Correction of the Memory Trajectory

The memory trajectory is generated under the premise that the coal seam conditions of a same coal mining area along the coal seam strike can be approximately considered the same. However, due to thicker coal seam or in special conditions, the curve of the coal rock boundary will change during the cutting process, and the initial memory trajectory will have an offset. Therefore, in the present invention, the tracking curve will be corrected continuously on the basis of the memory cutting and according to various information, so that the control is more accurate.

In the present invention, the roller angle obtained by the rotary encoder, the roller height obtained by the oil cylinder stroke position sensor and the angle of inclination of the coal cutter obtained by the electronic inclinometer are effectively fused in the decision level according to the D-S evidence theory to obtain the actual trajectory of the roller, and the actual trajectory of the roller is then fused with the proportion information of coal rock cut by the coal cutter to obtain a next memory tracking trajectory.

4. During the coal mining process, the control-layer high-speed industrial control computer performs automatic tension control of scraper conveyer chain according to the pressure of the oil cylinder, the current of the motor of the scraper conveyer and the position of the coal cuter, and an automatic tension device for chain links of the scraper conveyer is automatically controlled after comprehensively judging parameters such as the pressure of the oil cylinder, the operation state (operation current) of the scraper conveyer and the coal mining position. This process includes two steps, i.e., pre-tensioning and automatic tensioning.

1) Pre-Tensioning

The pre-tensioning includes two parts, i.e., tensioning the chain when powered-on and loosening the chain when powered-off, so that it is realized that the scraper chain is tensioned to a certain extent before the scraper conveyer is powered on, in order to avoid failures resulted from too loosening of the chain; and, the scraper chain is loosened to a certain extent after the scraper conveyer is powered off, in order to reduce the fatigue and deformation of the chain.

2) Automatic Tensioning

After the scraper conveyer transmits a start signal and performs the pre-tensioning function, the scraper conveyer is powered on and transmits a successful start signal, and the automatic tensioning device for the chain of the scraper conveyer automatically monitors the pressure of the tension hydraulic cylinder and performs the following comparison:

If the pressure of the hydraulic cylinder is less than the lower hysteresis range calculated by the "pressure calculation formula", the time for tensioning is measured, and a hydraulic cylinder extension procedure will be executed.

If the pressure of the hydraulic cylinder is larger than the upper hysteresis range calculated by the "pressure calculation formula", the time for loosening is measured, and a hydraulic cylinder contraction procedure will be executed.

3) Pressure Calculation Formula

Figure 5:
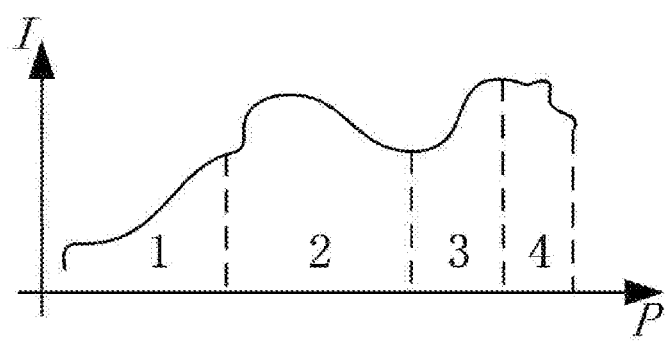
FIG. 5 is a schematic diagram of the relationship between the operation current I at a tail of a scraper conveyer and the pressure P of a hydraulic cylinder according to the present invention.

In accordance with the trial operation, the relationship curve of the operation current at the tail of the scraper conveyer and the pressure of the hydraulic cylinder in the ideal state is measured. As shown in FIG. 5, the curve is divided into multiple sections to obtain an approximate relation of this curve. During the actual operation, a region of the operation current at the tail of the scraper conveyer is judged, and the pressure of the hydraulic cylinder in the ideal state is calculated according to the previously obtained region relation. the standard pressure value of the automatic tension control is obtained by multiplying the pressure value by the weight of the position of the coal cutter.

The invention claimed is:

1. A method for realizing a centralized control platform for large fully-mechanized coal mining face equipment, characterized by comprising: under the centralized coordination control of the centralized control platform, automatically performing an unmanned coal mining according to coal mining process based on subsystems of the large fully-mechanized coal mining face equipment by a control-layer high-speed industrial control computer and a high-speed data acquisition card thereof, a front-end development platform, a database and a communication network, the subsystems comprising a coal cutter system, a hydraulic support system, a coal mining face transportation system, an emulsion pump station system, a mobile transformer substation system and a video monitoring system;

wherein the method for realizing the centralized control platform further comprises:

A. real-time monitoring in which the high-speed data acquisition card acquires information of the subsystems of the large fully-mechanized coal mining face equipment, and the information is collected and fused by the control-layer high-speed industrial control computer and then enters the control-layer high-speed industrial control computer through network communication protocol for real-time monitoring control, wherein the real-time monitoring control comprises:

(A) I. monitoring, in real time, vibration of a cutting head of a coal cutter, current and temperature of a motor and temperature of a reduction gearbox in the coal cutter system, temperature, oil temperature, oil level and oil pressure of a pump box, input/output current, voltage, frequency and power of a transducer, operation speed and operation direction of the coal cutter in the coal cutter system, and flow, pressure and external spray flow of each portion of cooling water, wherein, when a monitored value exceeds a set value, the system gives an alarm automatically and displays failure information;

(A) II. monitoring, in real time, front column pressure, rear column pressure and transition stroke of a hydraulic support in the hydraulic support system and position of the coal cutter;

(A) III. monitoring, in real time, motor current and winding temperature of a scraper conveyer in the coal mining face transportation system, oil temperature, oil level and axle temperature of the reduction gearbox, pressure and flow of the cooling water, pressure of an oil cylinder, and failure information of coal piling, smoke, longitudinal tear, belt breakage, slipping and tensioning of a belt portion;

(A) IV. monitoring, in real time, water supply, oil supply, oil temperature, oil level, inlet pressure, outlet pressure, liquid level and concentration of the emulsion pump station system; and (A) V. monitoring, in real time, A/B/C phase current, voltage, leakage current and power frequency on a primary side of the mobile transformer substation system, voltage, current and insulation resistance on a secondary side of the mobile transformer substation system, and electric leakage, overcurrent, short circuit, over-temperature and open-phase failure states on both the primary side and the secondary side;

B. centralized coordination control in which the information transmitted from the subsystems of the large fully-mechanized coal mining face equipment is analyzed and judged by the control-layer high-speed industrial control computer, and corresponding control is performed according to the position of the coal cutter if it is judged that the subsystems of the large fully-mechanized coal mining face equipment are in their normal state, wherein the centralized coordination control comprises:

(B) I. activating and controlling the equipment in a reverse coal flow order, when the fully-mechanized coal mining face starts to mine coal;

(B) II. dual judging the position of the coal cutter, comprising:

continuously memorizing a number of chain links of the scraper conveyer walked by the coal cutter during the operation of the coal cutter so as to judge a walking position of the coal cutter, wherein at a beginning of operation, the coal cutter is located at one end of the coal mining face, which is set as an initial position, and wherein if the walking position of the coal cutter is consistent with the position of the coal cutter detected by the hydraulic support system, an action of the corresponding hydraulic support is automatically controlled, thereby automatically tracking the coal cutter and pulling the supports, and if the walking position of the coal cutter is inconsistent with the position of the coal cutter detected by the hydraulic support system, an alarm is given out and the operation of the coal cutter is stopped, and further wherein once one reciprocating coal mining process is completed, the coal cutter returns to the initial position on the coal mining face;

(B) III. automatically judging, by the centralized control platform, a coal mining process section according to the position and operation direction of the coal cutter, and then transmitting a centralized control command for allowing the corresponding hydraulic support to automatically track the coal cutter to implement a corresponding action;

(B) IV. performing, by the control-layer high-speed industrial control computer, automatic adjustment of a height of a roller during the coal mining process according to the vibration of the cutting head of the coal cutter, and the oil pressure and the current of a roller motor, wherein the automatic adjustment is carried out through a trajectory target preview control scheme based on memory cutting, which is realized according to a coal rock interface recognition technology with a radial basis function neural network;

(B) V. performing, by the control-layer high-speed industrial control computer, automatic tension control for chain links of the scraper conveyer during the coal mining process according to the pressure of the oil cylinder, the current of the motor of the scraper conveyer and the position of the position of the coal cutter, wherein an automatic tension device for the chain links of the scraper conveyer is automatically controlled by the combination of the pressure of the oil cylinder, the operation current of the scraper conveyer and the coal mining position;

(B) VI. automatically controlling, by the control-layer high-speed industrial control computer, on and off of a camera in the video monitoring system during the coal mining process according to the position of the coal cutter, to reduce the transmission of a large amount of video monitoring information; and (B) VII. acquiring the operation state information of the subsystems of the large fully-mechanized coal mining face equipment to judge whether the subsystems operate normally when coal mining is started by the control-layer high-speed industrial control computer, wherein an inquiry signal is transmitted to each subsystem, the subsystem of the large fully-mechanized coal mining face equipment, upon receiving the inquiry signal, responds appointed information indicating its own state to the control-layer high-speed industrial control computer, and a starting signal is transmitted by the control-layer high-speed industrial control computer of the centralized control platform if starting conditions are satisfied, in which:

a. during the coal mining process, when it is detected that coal piling occurs in the scraper conveyer, an end hydraulic support in an electro-hydraulic control system is immediately controlled by the control-layer high-speed industrial control computer to start an action of an iron claw mounted on a first-level protection side so as to quickly feed coal pile into a transfer link;

b. during the coal mining process, the centralized control command is transmitted by the centralized control platform to an end controller of an electro-hydraulic automatic control system, and a support controller is controlled by the end controller to perform a specific action; wherein when it is detected that the communication with the electro-hydraulic control system of the hydraulic support is interrupted, another end controller of the electro-hydraulic control system is activated immediately, and normal control over controllers on opposing sides of an interruption point are respectively performed by the two end controllers where an interruption failure occurs;

c. during the coal mining process, the operation speed of the coal mining face transportation system equipment is automatically adjusted by the centralized control platform according to the operation status of the coal cutter; and d. during the coal mining process, when it is judged by the centralized control platform that the inlet pressure and outlet pressure of an emulsion pump are greater than 1.1 Mpa, a reverse-washing filter is activated automatically; and C. an information communication network serving as the network structure and the communication mode for transmission of information between the subsystems of the large fully-mechanized coal mining face equipment and the centralized control platform, the control-layer high-speed industrial control computer and a control-layer high-speed industrial control computer for the subsystems of the large fully-mechanized coal mining face equipment utilizing network communication based on a TCP/IP protocol, wherein the information communication network is controlled by:

(C) I. performing communication between the control-layer high-speed industrial control computer and the high-speed industrial control computers for the subsystems through the information communication network; and (C) II. performing one polling on all the subsystems as servers of the large fully-mechanized coal mining face equipment every 500 ms by the control-layer high-speed industrial control computer as a client, and providing a control quantity according to the result of polling.

2. The method according to claim 1, characterized in that the coal mining face transportation system comprises a scraper conveyer, a transfer machine, a crusher and a rubber belt conveyer.

3. The method according to claim 1, characterized in that the control-layer high-speed industrial control computer is high-speed embedded computer UNO-3072A, the high-speed data acquisition card is PCI-1716, the front-end development platform is PowerBuilder, the database is SQLServer, the communication protocol is Modbus TCP/IP, and the communication network is industrial Ethernet.

* * * * *